(12) United States Patent
Downes et al.

(10) Patent No.: US 9,342,665 B2
(45) Date of Patent: May 17, 2016

(54) SYSTEMS, METHODS, AND APPARATUS FOR FACILITATING CLIENT-SIDE DIGITAL RIGHTS COMPLIANCE

(75) Inventors: Stephen Downes, Moncton (CA); Rodrigue Savoie, Dieppe (CA)

(73) Assignee: D2L Corporation, Kitchener, Ontario (CA)

( * ) Notice: Subject to any disclaimer, the term of this patent is extended or adjusted under 35 U.S.C. 154(b) by 216 days.

(21) Appl. No.: 13/345,573

(22) Filed: Jan. 6, 2012

(65) Prior Publication Data

US 2012/0180105 A1    Jul. 12, 2012

Related U.S. Application Data

(60) Provisional application No. 61/430,605, filed on Jan. 7, 2011.

(51) Int. Cl.
*G06F 21/10* (2013.01)
*G06F 21/62* (2013.01)

(52) U.S. Cl.
CPC ............... *G06F 21/10* (2013.01); *G06F 21/62* (2013.01); *G06F 21/629* (2013.01); *G06F 21/6209* (2013.01); *G06F 21/6227* (2013.01)

(58) Field of Classification Search
CPC ... G06F 21/62; G06F 21/629; G06F 21/6209; G06F 21/6227
USPC .................................................. 726/1, 26, 27
See application file for complete search history.

(56) References Cited

U.S. PATENT DOCUMENTS

| | | | |
|---|---|---|---|
| 7,415,439 B2* | 8/2008 | Kontio et al. ................... 705/53 |
| 7,669,225 B2* | 2/2010 | Peled et al. ...................... 726/1 |
| 2008/0034441 A1* | 2/2008 | Saha et al. ...................... 726/27 |
| 2009/0138937 A1* | 5/2009 | Erlingsson et al. .............. 726/1 |
| 2009/0265760 A1* | 10/2009 | Zhu et al. ......................... 726/3 |
| 2010/0269149 A1* | 10/2010 | Lee et al. .......................... 726/1 |
| 2010/0287618 A1* | 11/2010 | Howell et al. ................... 726/26 |
| 2011/0145580 A1* | 6/2011 | Auradkar et al. ............. 713/170 |

OTHER PUBLICATIONS

Anne Anderson and Hal Lockhart, editors. "SAML 2.0 profile of XACML v2.0" Published Feb. 1, 2005 (21 pages) http://docs.oasis-open.org/xacml/2.0/access_control-xacml-2.0-saml-profile-spec-os.pdf.*

(Continued)

*Primary Examiner* — Joseph P Hirl
*Assistant Examiner* — Thomas Gyorfi
(74) *Attorney, Agent, or Firm* — Bereskin & Parr LLP

(57) ABSTRACT

According to one aspect there is provided a method and an apparatus for facilitating intellectual property rights compliance that is compliant with a same-origin security policy that prohibits the application from executing application-specific instructions from the first domain that access application-specific instructions from the second domain. The method includes receiving a structured document from a first domain, the structured document having at least one content object, a reference to at least one digital rights compliance (DRC) object located on a second domain and associated with the at least one content object, and application-specific instructions being executable by the application. The at least one DRC object is defined in a non-executable format and contains information indicative of rights associated with the at least one content.

27 Claims, 7 Drawing Sheets

(56) References Cited

OTHER PUBLICATIONS

John Tolbert. "XACML for Export Control and Intellectual Property Protection" © 2009 The Boeing Company (5 pages) http://www.w3.org/2009/policy-ws/papers/Tolbert.pdf.*

Russel Kay. "ComputerWorld: How-To XACML" Published May 19, 2003 (2 pages) http://www.computerworld.com/article/2570927/app-development/xacml.html.*

Jake Wu and Panos Periorellis. "Authorization-Authentication Using XACML and SAML" May 2005 © 2004 University of Newcastle upon Tyne (20 pages) http://www.cs.ncl.ac.uk/publications/trs/papers/907.pdf.*

Stephen Downes, Referrer System, 2003, available online at: http://web.archive.org/web/20030401084113/.

Wilbert Kraan, A feature or a bug; SCORM and cross domain scripting, CETIS, 2003, available online at: http://zope.cetis.ac.uk/content/20030622203659.

Introducing JSON (Javascript Object Notation), 2006, available online at: http://www.json.org/.

Stephen Downes et al., Managing Digital Rights Using JSON, Jan. 9, 2010, available online at: http://www.downes.ca/post/51339.

\* cited by examiner

US 9,342,665 B2

SYSTEMS, METHODS, AND APPARATUS FOR FACILITATING CLIENT-SIDE DIGITAL RIGHTS COMPLIANCE

RELATED APPLICATIONS

This application claims the benefit of U.S. Provisional Patent Application Ser. No. 61/430,605 filed Jan. 7, 2011, the entire contents of which are hereby incorporated by reference herein for all purposes.

FIELD

The described embodiments relate to facilitating digital rights compliance for content, and in particular to facilitating compliance with intellectual property rights of digital content by client-side computers.

INTRODUCTION

The Internet provides new opportunities and challenges to rights holders who wish to market their digital content (e.g. works such as electronic books, multimedia files, etc.). Significant resources are often expended tracking and registering the legal rights associated with such digital content. Furthermore, enforcing or ensuring end user compliance with the digital rights associated with digital content can result in processing and overhead that increases the cost of creating and using digital content. Specifically, in client-server environments in which digital content may originate from multiple sources, the management of digital rights can quickly become complex and expensive.

The development of digital rights compliance techniques in client-server environments has traditionally focused on proprietary server-side approaches. Server-side solutions may be advantageous in some circumstances. For example, such approaches may permit circumventing of limitations that are inherent in client-side processing, such as restrictions on a client computer that prevent content from one origin from being used at another location.

It is also generally accepted that server-side solutions permit strict enforcement of end user compliance with digital rights, since digital content will not be provided to end users until compliance is confirmed (e.g. the user has paid for use of the digital content). Conversely, if digital content is sent to end users prior to compliance confirmation, there is an increased risk that end users may circumvent the digital rights associated with that content.

However, proprietary server-side solutions must be implemented on the server side, which results in centralized and potentially closed systems of digital rights management that may be unable to effectively manage digital rights in open environments with multiple resource sources.

DRAWINGS

The embodiments herein will now be described, by way of example only, with reference to the following drawings, in which.

DESCRIPTION OF VARIOUS EMBODIMENTS

Figure 1:
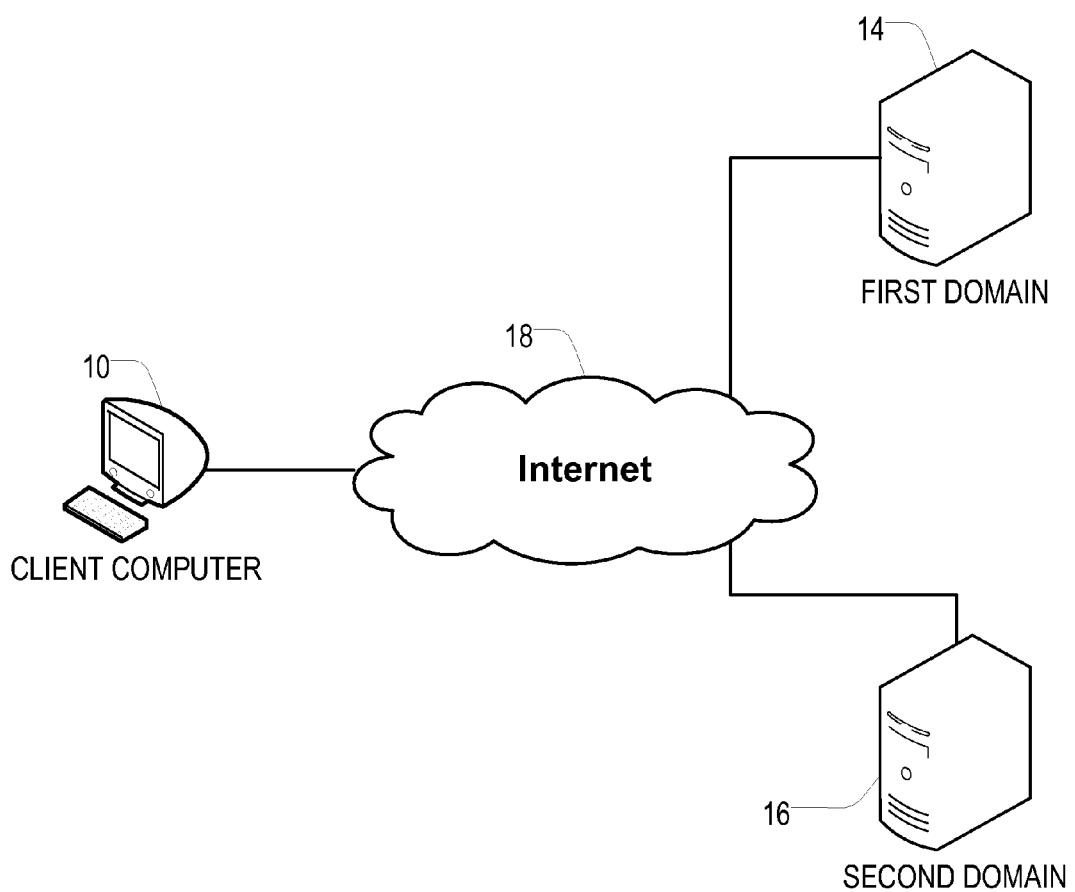
FIG. 1 is a schematic diagram of a client computer for facilitating compliance with digital rights according to one embodiment shown connected to a first domain and a second domain.

It will be appreciated that numerous specific details are set forth in order to provide an understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Some embodiments of the systems and methods described herein may be implemented in hardware or software, or a combination of both. However, in some cases these embodiments are implemented in computer programs executing on programmable computers each comprising at least one processor, a data storage system (including volatile and non-volatile memory and/or other storage elements), at least one input device, and at least one output device. For example and without limitation, the programmable computers may be a mainframe computer, server, personal computer, laptop, personal data assistant, tablet computer, or cellular telephone. Program code may be applied to input data to perform the functions described herein and generate output information. The output information may be applied to one or more output devices in known fashions.

Each program may be implemented in a high level procedural or object oriented programming and/or scripting language to communicate with a computer system. However, the programs can be implemented in assembly or machine language, if desired. In any case, the language may be a compiled or interpreted language. Each such computer program may be stored on a storage media or a device (e.g. read only memory (ROM) or magnetic diskette) readable by a general or special purpose programmable computer, for configuring and operating the computer when the storage media or device is read by the computer to perform the procedures described herein. The systems may also be considered to be implemented as a non-transitory computer-readable storage medium, configured with a computer program, where the storage medium so configured causes a computer to operate in a specific and defined manner to perform the functions described herein.

According to one aspect, there is provided a client computer for facilitating intellectual property rights compliance having a hardware network module connectable to at least one first domain and at least one second domain, a processor operatively connected to the hardware network module, and a data-storage device operatively connected to the processor, the data-storage device storing instructions. The instructions are executable by the processor to provide an application for receiving a structured document from the first domain, the structured document having at least one content, a reference to at least one digital rights compliance (DRC) object located on at least one second domain, and application-specific instructions being executable by the application, the at least one DRC object being defined in a non-executable format and containing information indicative of rights associated with the at least one content, and executing the application-specific instructions to cause the application to send at least one request to the at least one second domain for the at least one DRC object, receive the at least one DRC object from the at least one second domain and present the at least one content in accordance with the at least one DRC object. The application is compliant with a same-origin security policy that prohibits the application from executing application-specific instructions from the first domain that access application-specific instructions from the at least one second domain.

According to another aspect, there is provided a method for facilitating intellectual property rights compliance by an application having the steps of receiving a structured document from a first domain, the structured document having at least one content object, a reference to at least one digital rights compliance (DRC) object located on a second domain and associated with the at least one content object, and application-specific instructions being executable by the application, the at least one DRC object being defined in a non-executable format and containing information indicative of rights associated with the at least one content, executing the application-specific instructions to cause the application to send at least one request to the second domain for the at least one DRC object, receiving the at least one DRC object from the second domain, executing the application-specific instructions to cause the application to modify the structured document by incorporating the at least one DRC object into the structured document, and executing the application-specific instructions to cause the application to present the at least one content object in accordance with the at least one DRC object. The application is compliant with a same-origin security policy that prohibits the application from executing application-specific instructions from the first domain that access application-specific instructions from the second domain.

According to another aspect, there is provided a non-transient physical computer-readable storage medium storing a structured document, the structured document having at least one content object, a reference to at least one digital rights compliance (DRC) object located on another domain, the at least one DRC object being defined in a non-executable format and containing information indicative of rights associated with the at least one content, and instructions being executable by an application for performing operations comprising sending at least one request to the remote domain for the at least one DRC object, receiving the at least one DRC object from the remote domain, and presenting the at least one content in accordance with the at least one DRC object. The application is compliant with a same-origin security policy that prohibits the application from executing application-specific instructions from a first domain that causes the application to execute application-specific instructions from a second domain.

Referring now to FIG. 1, illustrated therein is a client computer 10 for facilitating intellectual property rights compliance for digital content according to one embodiment. The client computer 10 is shown connected to the Internet 12, and (via the Internet 12) to a first domain 14 and a second domain 16.

Figure 2:
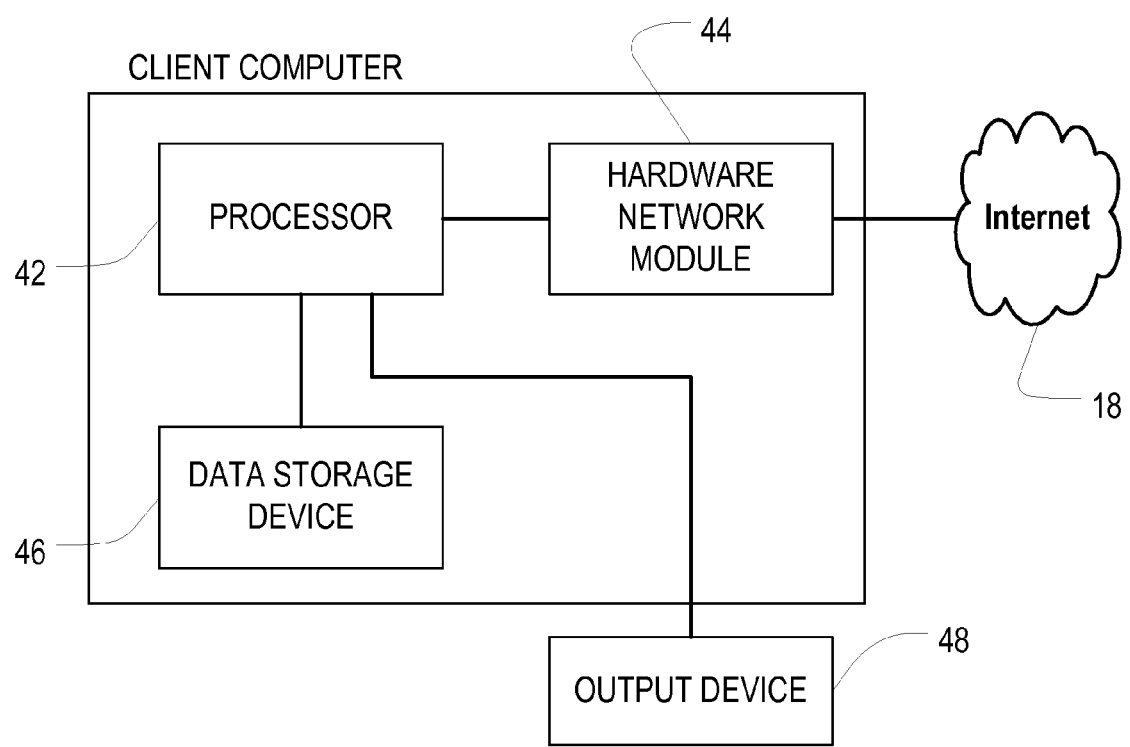
FIG. 2 is a schematic diagram illustrating components of the client computer of FIG. 1.

As shown in FIG. 2, the client computer 10 has a hardware network module 44 connectable to the first domain 14 and the second domain 16. The client computer 10 also has a processor 42 operatively connected to the hardware network module 44, and a data-storage device 46 operatively connected to the processor 42. As shown, the processor 42 may be connected to an output device 48, such as a display, as will be described further below. In some embodiments, the client computer 10 may have a plurality of processors, network modules, and/or data storage devices. The client computer 10 may have other types of components, such as a discrete graphics processor, a discrete data storage device (or both) for graphics related data.

Figure 3:
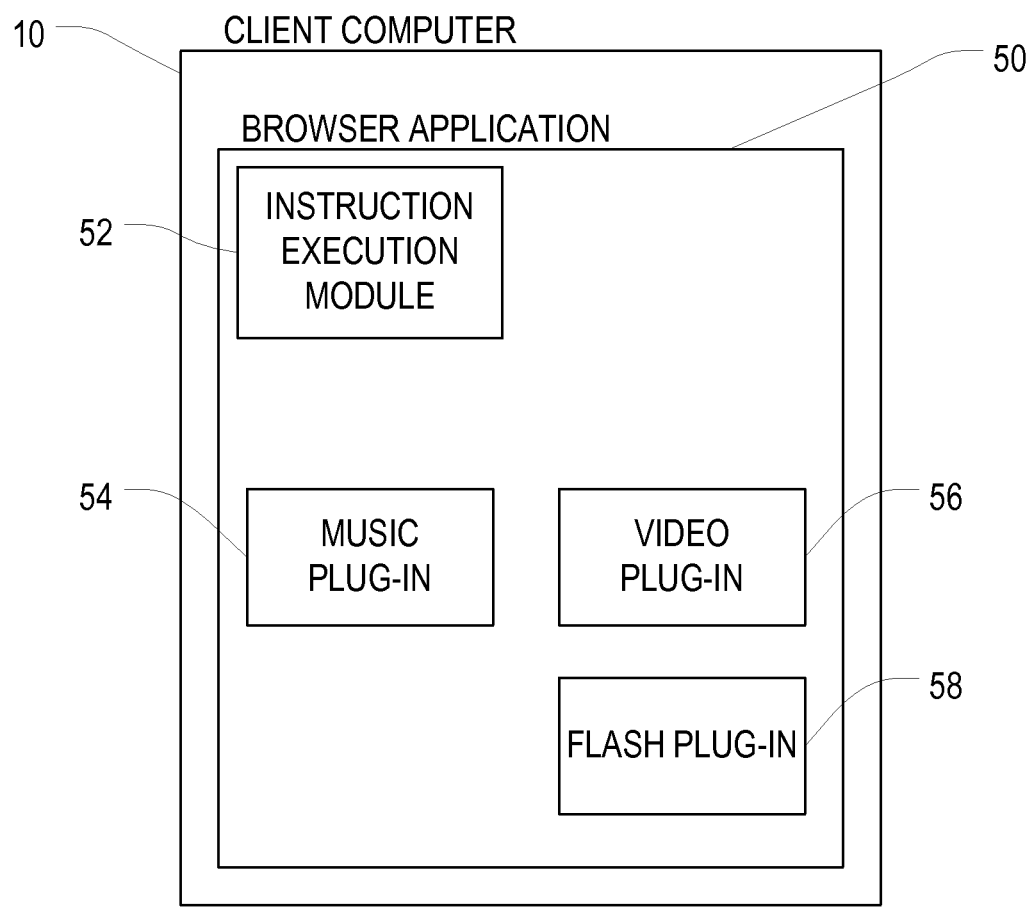
FIG. 3 is a schematic diagram illustrating components of the application on the client computer of FIG. 1.
Figure 4:
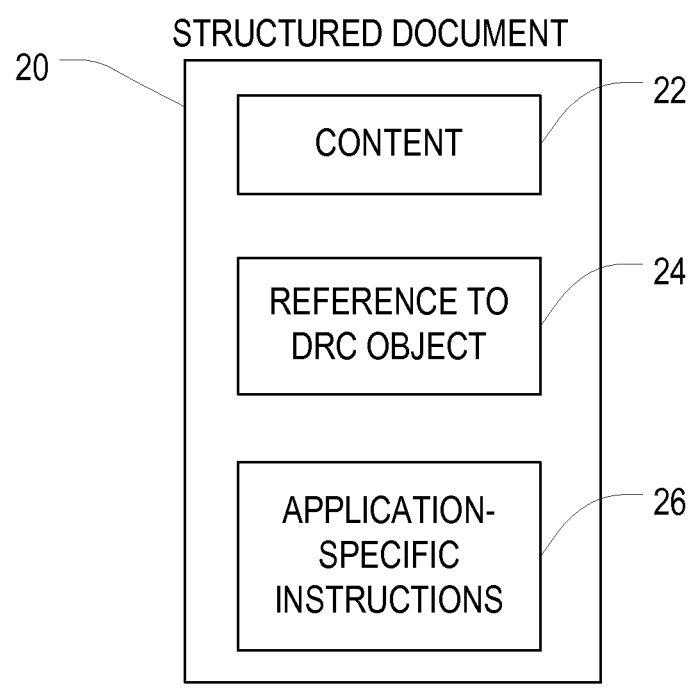
FIG. 4 is a schematic diagram illustrating components of a structured document received by the application of FIG. 3.

Generally, the data storage device 46 of the client computer 10 stores instructions that are executable by the processor 42 to provide an application (e.g. application 50 as described below and shown in FIG. 3) that is configured to receive a structured document 20 (as shown in FIG. 4) from the first domain 14.

The structured document 20 includes at least one content 22, a reference 24 to at least one digital rights compliance (DRC) object 30 located on the second domain 16 and which is associated with the at least one content 22, and application-specific instructions 26 being executable by the application 50. The DRC object 30 is defined in a non-executable format and contains information indicative of digital rights associated with the at least one content 22.

Generally, the application 50 executes the application-specific instructions to cause the application 50 to send at least one request to the second domain 16 for the at least one DRC object 30, receive the at least one DRC object 30 from the second domain 16, and present the at least one content 22 in accordance with the at least one DRC object 30.

The application 50 is configured so as to be compliant with a "same-origin security policy" that generally prohibits the application 50 from executing application-specific instructions 26 from one domain (e.g. the first domain 14) that would cause the application 50 to execute application-specific instructions from another domain (e.g. the second domain 16).

Turning again to FIG. 2, in some embodiments, the hardware network module 44 may be a device that is capable of facilitating data communication with the first domain 14 and the second domain 16. For example, the network module 44 may be a wired network device such as an Ethernet network card. The hardware network module 44 may be a wireless network device such as an IEEE 802.11 ("WiFi") compliant network device, a cellular network device to connect to a cellular network (e.g. GSM, GPRS, EDGE, HSDPA), and so on.

The network module 44 is operatively connected to the first domain 14 and the second domain 16. As shown, in this embodiment the network module is connected to the Internet 18 and through the Internet 18 to the first domain 14 and the second domain 16. The network module 44 may also connect to the domains 14 and 16 in other ways. For example, the network module 44 may connect to one of the domains 14 or 16 without connecting to the Internet 18 and then connect to the other domain through the Internet. In another example, the network module 44 may connect to both of the domains 14, 16 without connecting to the Internet 18 (e.g. via an Intranet).

In other examples, the network module 44 may connect to more than the first domain 14 and second domain 16, but may also connect to other domains.

As stated above, there may be more than one network module 44. If there is more than one network module 44, it may be that one of the hardware modules connects to one of the domains 14 or 16, while another hardware module connects to the other one of the domains 14 or 16.

As shown, the processor 42 is also connected to the output device 48. The output device 48 generally communicates information for consumption or observation by one or more users of the client computer 10, and which may differ depending on the type of client computer 10. For example, the output device 48 may be an LCD or CRT display if the client computer 10 is a desktop, and a laptop display if the client computer 10 is a laptop. In another example, the output device 48 may be a display screen on a smart phone or a PDA.

As shown, the output device 48 is operatively connected to the processor 42. In other embodiments, the output device 48 may be connected to a discrete graphics processor on a dedicated video card.

The data storage device 46 may include volatile memory, non-volatile computer memory, or both. For example, the data storage device 46 may include random access memory (RAM), magnetic computer storage devices such as hard disk drives, and flash memory. In some embodiments, the client computer 10 may comprise more than one type of data storage device 46. For example, the client computer 10 may have a hard disk drive and RAM.

The data storage device 46 generally has instructions being executable by the processor 42 to provide the application 50, so that the application 50 is capable of retrieving and executing application-specific instructions 26 contained in the structured document 20. Examples of the application 50 could include web-browser applications such as Microsoft Internet Explorer, Safari, Mozilla Firefox, Chrome, and so on.

The application 50 may also differ based on the type of client computer 10. For example, the application 50 may be resident on and/or optimized for mobile computing platforms found on mobile computing devices, such as smart phones and PDAs.

In some embodiments, it may be possible for the data storage device 46 to contain instructions being executable by the processor 42 to provide more than one application 50 on a single client computer 10.

Returning again to FIG. 3, illustrated therein are various components of the application 50. The components shown herein are only for illustrative purposes and the number and the type of components and the logical organization of the components may differ in other embodiments.

Generally, the application 50 comprises instruction-execution module 52 for receiving and executing application-specific instructions. The application 50 may also have a number of optional plug-in applications installed. The installed plug-in applications could include a music playback plug-in 54, video playback plug-in 56, and flash plug-in 58.

The instruction execution module 52 generally receives and executes application-specific instructions 26 to provide various functionalities. For example, executing the application-specific instructions 26 may cause the application 50 to render various text, images or other digital content to the output device 48 for consumption by one or more users.

In one example, application-specific instructions may be executed to render a specific text at a specific location of the web page for display. In another example, instructions may be executed to render an image file at a specific location of the web page for display. In another example, the application-specific instructions may be executed to cause the application 50 to solicit user input and then send the user input back to the web-server from which the web page was retrieved.

In another example, the application-specific instructions 26 may be executed to cause the application 50 to retrieve another structured document from the same domain or from a different domain.

In another example, the application-specific instructions may be executed to cause the application 50 to save some information on the data storage device 46 (e.g. a cookie).

In another example, the application-specific instructions may be executed to cause the application 50 to render a video file for play back by a user.

The application-specific instructions may be written in various programming languages that are compatible with the application 50. For example, the application-specific instructions may be provided in Hyper Text Mark-up Language ("HTML"). In another example, the application-specific instructions may be provided in the form of JavaScript language.

It is also possible for the application-specific instructions to be provided in more than one language within the same structured document. In particular, HTML allows instructions in other languages to be embedded within HTML instructions. For example, a web page may have a begin tag <HTML> and an end tag </HTML> to indicate that the application-specific instructions contained therebetween are HTML syntax. However, within the HTML syntax, a second begin tag <SCRIPT language="JavaScript"> and a second end tag </SCRIPT> may be provided to further indicate that the instructions therebetween are in JavaScript. The application 50 will recognize the "begin" tags and "end" tags and process the instructions contained therebetween (including the JavaScript) accordingly. Furthermore, the application-specific instructions may be linked from (i.e. received from) an external source. That is, the instructions may not necessarily be contained in the structured document. For example, the tag <SCRIPT language-"JavaScript" src=[URL_X]"> indicates that the instructions in JavaScript are to be received from an external source, which in this example is URL_X. In other words, the instructions, in JavaScript, will be downloaded from URL_X and executed.

In some embodiments, the application 50 may include a language parser, or a compiler, or both.

In some embodiments, while the instruction execution module 52 may be able to execute application-specific instructions 26, it may not be able to execute instructions in content 22 to render the content embodied therein. In some situations, it may not be desirable for the instruction execution module 52 to render content 22 due to user-preference reasons, efficiency reasons, or other reasons.

For example, the instruction execution module 52 may be able to render some types of content 22 such as text, images, and basic sound effects. However, the instruction execution module 52 may not render other types of content 22 such as video, music, or flash based applications. Types of content 22 that are not rendered by the instruction execution module 52 may be provided to the installed plug-in applications 50 for execution.

In the exemplary application 50 as shown in FIG. 3, the music plug-in 54, the video plug-in 56, and the flash plug-in 58 are installed. In other embodiments, there may be different plug-in applications installed. Some plug-in applications may be able to execute more than one type of content 22. For example, a media-player plug-in application may be able to render both audio and video content 22.

Plug-in applications are generally used to render various types of content. For example, the video plug-in 56 may play back a video file. The rendered video may be displayed as part of the application 50 or in a separate display.

Depending on the type of content 22, rendering of the content 22 may provide functionalities other than media playback. For example, the flash plug-in 58 may execute flash content to provide an application or a game.

Generally, plug-in applications render content 22 independently of the application 50. That is, once invoked and the content 22 is provided to the plug-in application, the plug-in application will execute content 22 without further aid from the application 50.

Generally, the content 22 will contain an indicator of the type of content. For example HTML instruction <embed src="music.mid"/> indicates that the instructions contained in the file entitled music.mid is a Musical Instrument Digital Interface MIDI-sequention Sound (".mid") file type. Accordingly, the application 50 will forward the file to the appropriate plug-in or the instruction execution module 52 for playback.

For example, if the content 22 is an image, it may be formatted as a JPG, TFF, PNG, or GIF files. In another example, if the content 22 is an Adobe Flash animation, it may be formatted as a SWF file. In yet another example, if the content 22 is video file, it may be formatted as a MPEG or an AVI file.

It is also possible that some instructions in a structured document 20 are not executed by the client computer 10 at all. For example, instructions provided in the form of Active Server Pages (ASP), Java server environments instructions, or CGI scripts may be directed to execution by server-side applications.

As the structured documents 20 may be received from an untrustworthy domain, it is possible that some structured documents 20 may contain unscrupulous application-specific instructions 26 that can harm the client computer 10 when they are executed. For instance, in one example executing particular application-specific instructions 26 may cause the application 50 to provide personal information stored in a cookie file to an unauthorized domain. In another example, executing the application-specific instructions 26 may cause the application 50 to harm file systems of the client computer 10.

To address these security concerns, the application 50 is configured to limit the application-specific instructions 26 that the application 50 will execute. That is, the application 50 will not execute application-specific instructions 26 that will cause the application 50 to act in a prohibited manner, as described below.

Specifically, the application 50 may be restricted from executing application-specific instructions 26 that cause the application 50 to execute instructions that are received from or sent to another website. This is sometimes referred to as the "same-origin policy" in that a file that is created by a structured document from a domain may only be modified by a structured document from the same domain. This prevents a structured document from accessing a file that is created by another domain. In other words, the policy permits application-specific instructions 26 from a structured document 20 received from domain 14 to only access other application-specific instructions received from the same domain 14. Execution of application-specific instructions received from other domains, also known as "cross-domain execution", is prohibited.

The application 50 may also be restricted from executing application-specific instructions 26 that cause the application 50 to modify any of the client computer 10 file systems beyond very narrowly defined "cookie" files. That is, the application-specific instructions 26 executed by the application 50 may be constrained to a "sandbox" and unable to modify files outside of that sandbox. This prohibits modification of the client computer 10 file systems that could otherwise be harmful to the client computer 10.

To determine whether instructions are received in a web page from a same origin, in addition to the domain name, application layer protocol and TCP port of the web page may also be considered. For example, a web page received from a same domain name but from a different TCP port or protocol may not be considered to be received from the same origin.

While the browser application 50 and the instruction execution module 52 are bound by the above security guidelines, plug-in applications do not necessarily comply with these guidelines.

As stated above, a web page may contain instructions in various languages, and certain instructions may be executed by the instruction execution module 52, and others, by relevant plug-in applications.

For example, the instructions provided in JavaScript in web pages may be executed by the instruction execution module 52 within the application 50 without requiring a plug-in application. Since the application 50 limits the type of instructions that it executes for security reasons, the JavaScript instructions that are executed are contained in the sandbox and bound by the same origin policy.

However, instructions executed by the plug-in applications and server side scripts are not being solely executed by the application 50. As such, they are not necessarily bound by the security limitations of the web browser. Additionally, if plug-in applications are used to interpret and run the application, the plug-in applications need to be downloaded and installed in the client system.

Referring back to FIG. 1, the client computer 10 is connected to the first domain 14, which may be an Internet website hosted by a server or a pool of servers, and may be identifiable over the Internet based on the Domain Name System (DNS). The first domain 14 is generally accessible by the client computer 10 and other computers connected to the Internet 18.

The first the domain 14 may employ authentication procedures before serving each computer that connects to the first domain. For example, the first domain 14 may require the client computer 10 to provide a log-in identification and password prior to serving the client computer 10.

The first domain 14 contains structured documents. Structured documents are electronic documents that are provided to a recipient, usually over a communication network. The documents are formatted and structured in a manner recognizable by the recipient such that the recipient may understand information provided in the structured documents. The format and the structure of the structured documents may follow known industry protocols, languages and/or standards.

In the embodiment shown, the first domain 14 is a web server hosting a web site and the structured documents are web pages.

Referring to FIG. 4, illustrated therein is a schematic diagram of components of an exemplary structured document 20. The structured document 20 includes content 22, reference to at least one digital rights compliance (DRC) object 24, and application-specific instructions 26.

The content 22 may be instructions to recreate various works or other content that intellectual property rights might attach to. For example, the content 22 may be instructions in binary or text to reproduce written works such as electronic books, articles, and learning objects. The content 22 may also be instructions to reproduce works such as images, audio recordings, video recordings, games, applications or other creations.

Depending on the type and size of the work, the content 22 in its entirety may be part of the structured document. For example, if the work in the content 22 is text, the content 22 may be relatively small such that the entire content 22 may be provided as part of the structured document 20.

However, the content 22 may also be a link to a different file outside of the structured document. In such cases, the content 22 may be provided in a separate file and sent to the client computer 10, and a reference to the file may be provided in the structured document 20.

Generally, when the client computer 10 requests the structured document 20 from the domain 14, the content 22 files referenced by the structured document 20 and external to the structured document 20 will also be transferred to the client computer 10. However, this arrangement may be modified depending on user preferences, bandwidth and/or other factors.

In cases where the size of the work is relatively large, the content 22 may be streamed to the client computer 10. For example, if the content 22 is a lengthy video file, it may be preferable to stream the video file instead of providing the file in entirety. This permits appropriate application to start rendering the content 22 without having to have the entirety of the content 22 (e.g. the complete file) present on the client computer 10.

The structured document 20 also includes a reference to at least one DRC object 24. The reference to the DRC object 24 indicates where a DRC object associated with the content 22 may be located. For example, the reference to the DRC object 24 may be a web address of the second domain 16 whereby the associated DRC object may be obtained.

The structured document 20 also includes application-specific instructions 26. The application-specific instructions 26 are instructions that may be parsed and executed by applications for which the instructions are provided. In the embodiment as shown, application specific instructions 26 are application-specific instructions executable by the application 50 as described above.

Also shown in FIG. 1, the client computer 10 is also connected to a second domain 16, which may be an Internet website hosted by a server or a pool of servers, and which may be identifiable over the Internet based on the Domain Name System (DNS). Generally, the second domain 16 is accessible by the client computer 10 and other computers connected to the Internet 18.

The second domain 16 is different domain from the first domain 14 in that structured documents received from the first domain 14 and the second domain 16 will not be considered to be from the same origin for the purposes of the same origin policy. As stated above, to determine whether instructions are received in a web page from a same origin, characteristics such as the domain name, application layer protocol and TCP port of the web page may be considered. As such, the first domain 14 and the second domain 16 may be considered as being from different origins even if they are from a single domain.

Figure 5:
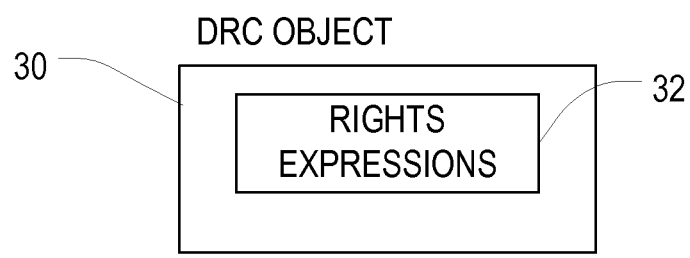
FIG. 5 is a schematic diagram illustrating components of a digital rights compliance (DRC) object received by the application of FIG. 3.

The second domain 16 has at least one DRC object associated with the content 22. For example, referring to FIG. 5, illustrated therein is an exemplary DRC object 30 associated with the content 22 in the structured document 20. The DRC object 30 is referenced by the reference to the DRC object 24 in the structured document 20.

The DRC object 30 includes rights expressions 32. The rights expressions 32 contain information about permitted use of the associated content 22 and conditions for using the associated content 22. Permitted uses of the content 22 may include various actions that may be performed with a given content 22. For example, permitted use of the content 22 may include viewing the content 22, making a copy of the content 22, modifying the content 22, printing the content 22, and/or redistributing the content 22.

Conditions for using the content 22 may include various terms such as paying of a prescribed fee, agreeing to abide by terms of use, or any other condition that the rights owner of the content 22 may wish to impose in exchange for the permitted use of the content 22. For example, a condition for printing a textbook may be to pay the rights holder a prescribed fee. In another example, permission may be granted to read the content 22 (but not make copies of the content 22) without paying a fee.

The rights expressions 32 may also be presented as rights models. A rights model is a generic statement that identifies the owner of a set of content 22 and a set of zero or more licenses that are on offer with respect to the resources. For example a rights model may be that the owner of the content 22 will grant a license to any person to read but not to copy a document within a defined set of documents. This permits the owner of the document to define rights expressions 32 relating to a set of content 22 in bulk.

Because the first domain 14 and the second domain 16 are considered to be from different origins for the purposes of the same origin security policy, the rights expressions 32 are provided in a manner that does not violate the same origin policy. That is, the rights expressions 32 are described in a manner that is understandable to the application-specific instructions 26 in the structured document 20 without violating the same origin policy.

For example, the rights expressions 32 may be described in a non-executable format such as the JSON format. Information provided in JSON is not compiled or executed. The rights expressions 32 defined in JSON format are not parsed and executed by the instruction execution module 32. Instead, the rights expressions 32 defined in JSON format are treated as a data stack.

In some embodiments, a guided user interface may assist a user who is not skilled with JSON to create rights expressions 32. For example, a university instructor may be aided by a guided user interface to create rights expressions 32 in JSON.

The DRC object 30 also includes metadata 34. Metadata 34 may be application-specific instructions to incorporate the rights expressions 32 into the structured document 20 or any other information associated with the DRC object.

The rights expressions 32 provided in JSON could be incorporated using the JavaScript "document.write( )" function. For example, the application-specific instructions 26 may include the document.write( ) function to incorporate rights expressions 32 into the structured document 20.

Because the rights expressions 32 are defined in JSON, even though the rights expressions 32 is located on a different domain, they may be referred to by the application specific-instructions 26 without violating the same origin policy of the application 50.

As described above, the application 50 on the client computer 10 is capable of receiving and executing application specific instructions 26 provided in the structured document 20. Executing the application specific instructions 26 will cause the application 50 to function as follows.

First, the application 50 sends at least one request to the second domain 16 for the DRC object 30 associated with the content 22. This may be accomplished by using the network module 44.

The application 50 will then receive the DRC object 30 associated with the content 22 from the second domain 16. As stated above, the DRC object 30 comprises rights expressions 32.

The application 50 may then modify the structured document 20 by incorporating the DRC object 30 into the structured document 20. As stated above, this may be accomplished by the application 50 executing application specific instructions 26 in JavaScript language to incorporate the rights expressions 32 defined using JSON format. In other embodiments, other languages/standards may be used to incorporate the rights expressions 32 defined in JSON format.

The application 50 will then present the content 22 in accordance with the rights expressions 32. For example, if the rights expressions 32 indicate that there is an amount of money that is required to be paid for using the content 22, the application 50 may redirect the user to a web site capable of processing payments. The web site may be the first domain 14, the second domain 16, or another domain.

In another example, if the rights expressions 32 indicate that the content 22 may be viewed but not printed, the application 50 may disable an option in the application 50 to print the content 22. In yet another example, the rights expressions 32 may state a list of conditions for using the content 22 in a manner that prompts a user to indicate acceptance.

Other forms of presentation may be provided by the application 50 depending on the rights expressions 32.

By presenting the content 22 in accordance with the rights expressions 32, the application 50 facilitates intellectual property rights compliance by a user of the client computer 10.

Figure 6:
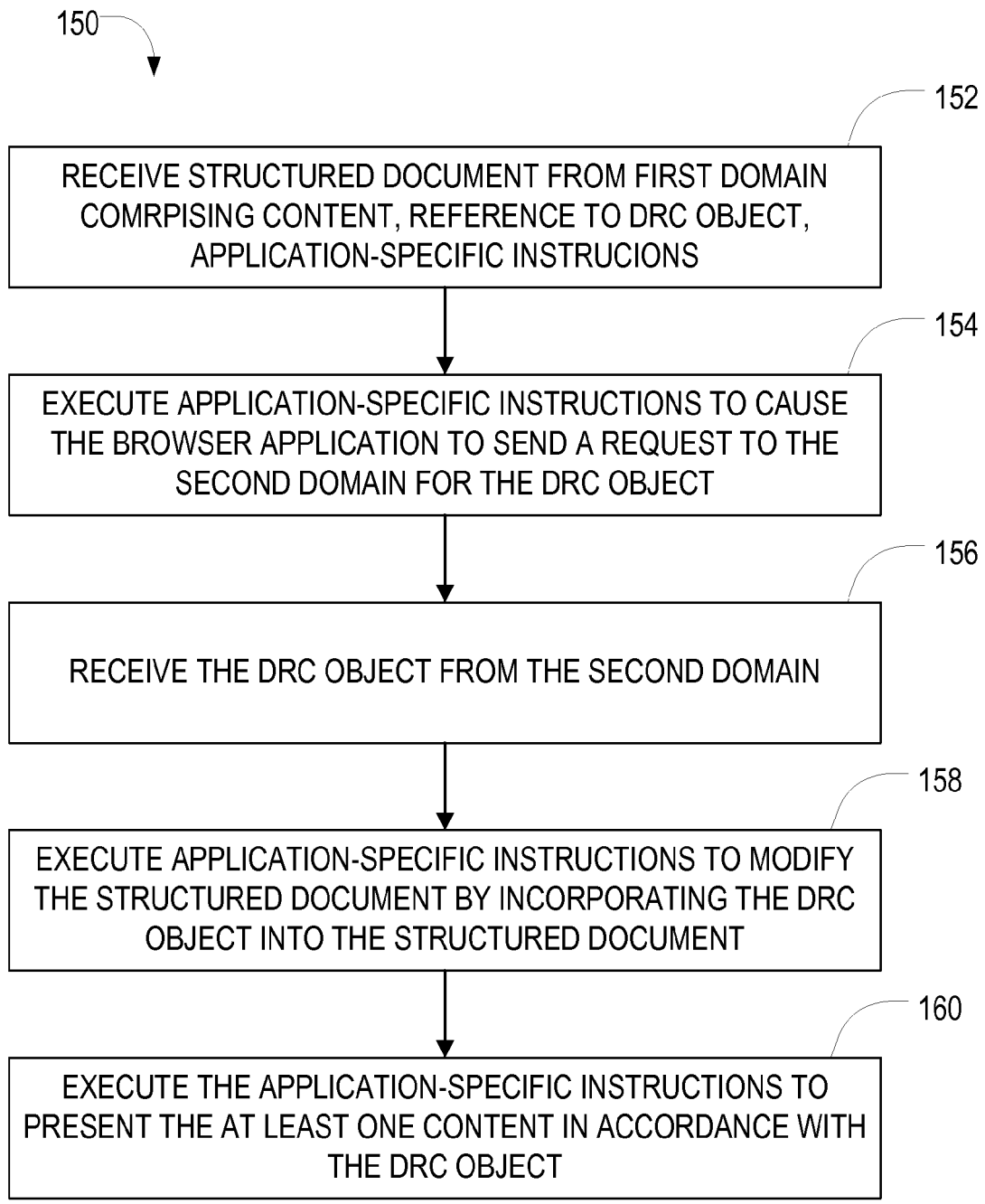
FIG. 6 is a method for facilitating compliance with intellectual property rights according to another embodiment.

Referring now to FIG. 6, illustrated therein is a method 150 for facilitating intellectual property rights compliance by an application according to another embodiment. The application may be the same as or similar to the application 50 on the client computer 10 described herein, which enforces the same origin security policy when executing instructions.

The method begins at step 152 at which the application receives a structured document from the first domain. The structured document may be the same as or similar to the structured document 20, which in one embodiment is a web page as described above. The first domain may be the same as or similar to the first domain 14, which in on embodiment is a web server as described herein above.

The structured document has at least one content, a reference to at least one digital rights compliance (DRC) object located on a second domain and associated with the at least one content, and application-specific instructions being executable by the application. The content may be the same as or similar to content 22 described herein above. The reference to the DRC object may be the same as or similar to the reference to the DRC object 24 described herein above. The application-specific instructions may be the same as or similar to the application-specific instructions 26 described above.

At step 154, the method 150 executes the application-specific instructions to cause the application to send at least one request to the second domain for the at least one DRC object. The second domain may be the same as or similar to the second domain 16, which in one embodiment is a web server. The method 150 then proceeds to step 156.

At step 156, the method receives the at least one DRC object from the second domain. The DRC object may be the same as or similar to the DRC object 30 described herein above. Once the DRC object is received, the method 100 proceeds to step 158.

At step 158, the method 150 executes the application-specific instructions to modify the structured document by incorporating the at least one DRC object into the structured document. The method 100 then proceeds to step 160.

At step 160, the method 150 executes the application-specific instructions to present the at least one content in accordance with the at least one DRC object.

Figure 7:
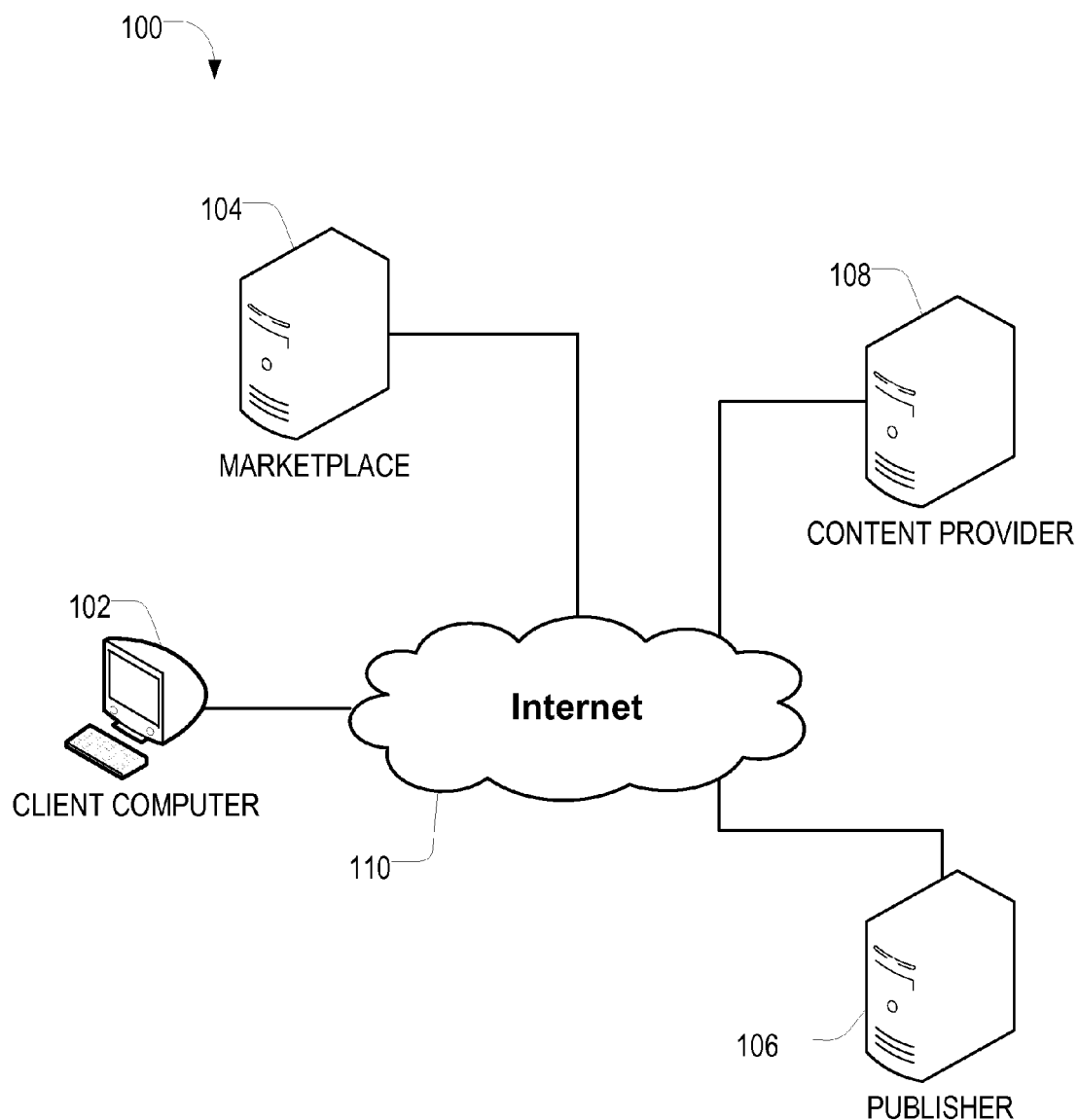
FIG. 7 is a system for facilitating compliance with intellectual property rights according to another embodiment.

Referring to FIG. 7, illustrated therein is a system 100 for disseminating content and facilitating intellectual property rights compliance according to another embodiment. The system 100 includes a client computer 102, a marketplace 104, a publisher 106, and a content provider 108. The client computer 102, the marketplace 104, the publisher 106, and content provider 108 are connected to a communication network 110 (e.g. the Internet).

The client computer 102 is a computing device such as the client computer 10 as described hereinabove. The client computer 102 may be used by a student or another user desirous of obtaining access to content provided by the content provider 108.

The content provider 108 may be a web server hosting various content. The content may be the same as or similar to content 22 described herein above. For example, the content may contain instructions to render a work such as text, image, video, or music. The content may be provided by various stakeholders in the education sector such as instructors, universities, colleges, or other educational institutions.

The publisher 106 may be a web server hosting the at least one DRC object associated with the content. The DRC object may be the same as or similar to the DRC object 30.

The DRC object has rights expressions and the rights expressions in the DRC object may be controlled by various publishers of the associated content. The publisher 106 of the content, in some embodiments may be the same as or similar to the content provider 108. In other embodiments, the publisher of the content may be different from the content provider 108. The publisher 106 may be one or more publishers of various education textbooks, articles, research publications, and other library materials.

The marketplace 104 is a web server connected to the Internet. The content provider 108 may list contents that it wishes to make available to the client computer 10 at the marketplace 104. The marketplace 104 may also be informed of the location of the associated DRC object associated with the available content. The marketplace 104 presents the available content to the client computer 102 for selection to the client computer 102.

Upon receiving a request from the client computer 102, the marketplace 104 will prepare a structured document to provide the content to the client computer. The structured document may be the same as the structured document 20 described herein above. The structured document with the requested content, reference to the associated DRC object located on the publisher 106, and browser application-specific instructions is then sent to the client computer 102 for execution.

The client computer 102 will receive structured document and execute the instructions in the structured document. In one embodiment, the client computer may perform the steps 152-160 as described above in method 150 to display the content in a manner to facilitate compliance with rights expressions in the DRC object.

While the steps of the above methods have been described sequentially hereinabove, it should be noted that sequential performance of the steps may not need to occur for successful implementation of the method. As will be evident to one skilled in the art, rearranging sequence of performance of the steps, omitting the performance of some steps, or performing the steps in parallel may be possible without abandoning the essence of the invention.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A client computer for facilitating intellectual property rights compliance comprising:
   a hardware network module connectable to at least one first domain and at least one second domain;
   a processor operatively connected to the hardware network module; and
   a data-storage device operatively connected to the processor, the data-storage device storing instructions, the instructions being executable by the processor to provide an application for
   i) receiving a structured document from the first domain, the structured document having at least one content, a reference to at least one digital rights compliance (DRC) object located on at least one second domain, and application-specific instructions being executable by the application, the at least one DRC object being defined in a non-executable format and containing information indicative of intellectual property rights associated with the at least one content; and
   ii) executing the application-specific instructions to cause the application to: send at least one request to the at least one second domain for the at least one DRC object, receive the at least one DRC object from the at least one second domain, and present the at least one content in accordance with the at least one DRC object;
   wherein the application is configured to limit application instructions that the application is permitted to execute such that the application is compliant with a same-origin security policy that prohibits the application from executing application-specific instructions from any domain that is different from the first domain.

2. The client computer of claim 1, wherein the at least one DRC object comprises rights expressions indicative of permitted use and conditions for using the at least one associated content.

3. The client computer according to claim 1 wherein the application-specific instructions comprise instructions that will further cause the application to incorporate the at least one DRC object into the structured document.

4. The client computer according to claim 3, wherein the at least one DRC object defined in the non-executable format is considered native to the structured document when the rights expressions are incorporated into the structured document such that the application may present the at least one content in accordance with the at least one incorporated DRC object without violating the same-origin security policy.

5. The client computer according to claim 1, wherein the at least one DRC object is defined in JavaScript Object Notation (JSON) format.

6. The client computer according to claim 1, wherein the application is further operable to control interaction with the at least one content based on the at least one DRC object.

7. The client computer according to claim 1 wherein the application is further operable to display at least some of the information contained in the at least one DRC object.

8. The client computer according to claim 1, wherein the application is a web browser application and the structured document is a web page.

9. The client computer according to claim 8 wherein the at least one DRC object is defined using JSON format, and the application-specific instructions further comprise instructions provided in JavaScript language that when executed cause the application to incorporate the at least one DRC object into the structured document.

10. A method for facilitating intellectual property rights compliance by an application comprising:
    receiving a structured document from a first domain, the structured document having:
    at least one content object,
    a reference to at least one digital rights compliance (DRC) object located on a second domain and associated with the at least one content object, and application-specific instructions being executable by the application,
    the at least one DRC object being defined in a non-executable format and containing information indicative of intellectual property rights associated with the at least one content;
    executing the application-specific instructions to cause the application to send at least one request to the second domain for the at least one DRC object;
    receiving the at least one DRC object from the second domain;
    executing the application-specific instructions to cause the application to modify the structured document by incorporating the at least one DRC object into the structured document; and
    executing the application-specific instructions to cause the application to present the at least one content object in accordance with the at least one DRC object;
    wherein the application is configured to limit application instructions that the application is permitted to execute such that the application is compliant with a same-origin security policy that prohibits the application from executing application-specific instructions from Hall any domain that is different from the first domain.

11. The method according to claim 10, wherein the at least one DRC object comprises rights expressions indicative of permitted use and conditions for using the at least one associated content.

12. The method according to claim 10, wherein the application-specific instructions comprise instructions that will further cause the application to incorporate the at least one DRC object into the structured document.

13. The method according to claim 12, wherein the at least one DRC object defined in the non-executable format is considered native to the structured document when the rights expressions (antecedent basis) are incorporated into the structured document such that the application may present the at least one content in accordance with the incorporated at least one DRC object without violating the same-origin security policy.

14. The method according to claim 10, wherein the at least one DRC object is being defined in JavaScript Object Notation (JSON) format.

15. The method according to claim 10, wherein the application is further operable to control interaction with the at least one content based on the at least one DRC object.

16. The method according to claim 10, wherein the application is further operable to display at least some of the information contained in the at least one DRC object.

17. The method according to claim 10, wherein the application is a web browser application and the structured document is a web page.

18. The method according to claim 17, wherein the at least one DRC object is defined using JSON format, and the application-specific instructions further comprise instructions provided in JavaScript language that when executed cause the application to incorporate the at least one DRC object into the structured document.

19. A non-transient physical computer-readable storage medium comprising:
    a structured document, the structured document having at least one content object, a reference to at least one digital rights compliance (DRC) object located on another domain, the at least one DRC object being defined in a non-executable format and containing information indicative of intellectual property rights associated with the at least one content, and instructions being executable by an application for performing operations including
        sending at least one request to the remote domain for the at least one DRC object;
        receiving the at least one DRC object from the remote domain; and
        presenting the at least one content in accordance the at least one DRC object;
    wherein the application is configured to limit application instructions that the application is permitted to execute such that the application is compliant a same-origin security policy that prohibits the application from executing application-specific instructions from any domain that is different from the first domain.

20. The computer-readable storage medium according to claim 19, wherein the at least one DRC object comprises rights expressions indicative of permitted use and conditions for using the associated at least one content.

21. The computer-readable storage medium according to claim 19, wherein the application-specific instructions comprise instructions that will further cause the application to incorporate the at least one DRC object into the structured document.

22. The computer-readable storage medium according to claim 21, wherein the at least one DRC object is defined in the non-executable format is considered native to the structured document when the rights expressions are incorporated into the structured document such that the application may present the at least one content in accordance with the incorporated at least one DRC object without violating the same-origin security policy.

23. The computer-readable storage medium according to claim 19, wherein the at least one DRC object is defined in JavaScript Object Notation (JSON) format.

24. The computer-readable storage medium according to claim 19, wherein the application is further operable to control interaction with the at least one content based on the at least one DRC object.

25. The computer-readable storage medium according to claim 19, wherein the application is further operable to display at least some of the information contained in the at least one DRC object.

26. The computer-readable storage medium according to claim 19, wherein the application is a web browser application and the structured document is a web page.

27. The computer-readable storage medium according to claim 26, wherein the at least one DRC object is defined using JSON format, and the application-specific instruction further comprises instructions provided in JavaScript language that when executed cause the application to incorporate the at least one DRC object into the structured document.

* * * * *